US009615322B2

(12) United States Patent
Choi et al.

(10) Patent No.: US 9,615,322 B2
(45) Date of Patent: Apr. 4, 2017

(54) METHOD AND SYSTEM FOR PROVIDING SERVICE BASED ON SPACE

(71) Applicant: Korea Advanced Institute of Science and Technology, Daejeon (KR)

(72) Inventors: Jun Kyun Choi, Daejeon (KR); Jin Hong Yang, Daejeon (KR); Yong Rok Kim, Daejeon (KR); Hyo Jin Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 148 days.

(21) Appl. No.: 14/182,102

(22) Filed: Feb. 17, 2014

(65) Prior Publication Data
US 2015/0230167 A1    Aug. 13, 2015

(30) Foreign Application Priority Data

Feb. 10, 2014    (KR) ........................ 10-2014-0014662

(51) Int. Cl.
| | | |
|---|---|---|
| *H04W 48/20* | (2009.01) | |
| *H04W 4/00* | (2009.01) | |
| *H04W 12/06* | (2009.01) | |
| *H04W 88/08* | (2009.01) | |
| *H04W 60/00* | (2009.01) | |

(52) U.S. Cl.
CPC .......... *H04W 48/20* (2013.01); *H04W 4/005* (2013.01); *H04W 12/06* (2013.01); *H04W 60/005* (2013.01); *H04W 88/08* (2013.01)

(58) Field of Classification Search
CPC ..... H04W 48/20; H04W 4/005; H04W 12/06; H04W 88/08; H04W 60/005

USPC ..... 455/410–411, 418–420, 432.1, 436–444, 455/456.1–457; 330/331

See application file for complete search history.

(56) References Cited

U.S. PATENT DOCUMENTS

| | | | | |
|---|---|---|---|---|
| 6,452,692 | B1 * | 9/2002 | Yacoub | G06F 3/1204 358/1.13 |
| 7,095,517 | B1 * | 8/2006 | Hori | G06Q 10/107 358/1.15 |
| 2006/0025132 | A1 * | 2/2006 | Karaoguz | H04L 12/2803 455/433 |
| 2008/0064395 | A1 * | 3/2008 | Sibileau | G08C 17/02 455/433 |
| 2008/0085699 | A1 * | 4/2008 | Hirano | H04W 36/0061 455/414.2 |

(Continued)

*Primary Examiner* — Michael Mapa
(74) *Attorney, Agent, or Firm* — Marshall, Gerstein & Borun LLP

(57) ABSTRACT

A method and system for providing a service based on space are disclosed herein. The method includes registering multiple smart access points respectively included in multiple spaces—each of the access points are connected to at least one Internet of Things (IoT) device that is further included in the corresponding space, providing first service control information to a first smart access point, in accordance with a request of the first smart access point, the first smart access point being accessed by a terminal of a user, among multiple access points, and providing second service control information to a second smart access point in accordance with a request of the second smart access point, when the terminal of the user accesses the second smart access point, among the multiple access points, and when the second smart access point recognizes a movement of the user.

19 Claims, 9 Drawing Sheets

(56) References Cited

U.S. PATENT DOCUMENTS

| | | | |
|---|---|---|---|
| 2009/0323635 A1* | 12/2009 | Gras | H04W 36/0011 370/331 |
| 2012/0311661 A1* | 12/2012 | Forssell | H04W 12/08 726/1 |
| 2015/0032840 A1* | 1/2015 | Daly, Jr. | H04L 67/1097 709/216 |
| 2015/0148009 A1* | 5/2015 | Webb | H04W 12/06 455/411 |
| 2015/0169340 A1* | 6/2015 | Haddad | G06F 9/45533 718/1 |

* cited by examiner

… (1)

METHOD AND SYSTEM FOR PROVIDING SERVICE BASED ON SPACE

This application claims the benefit of the Korean Patent Application No. 10-2014-0014662, filed on Feb. 10, 2014, which is hereby incorporated by reference as if fully set forth herein.

BACKGROUND OF THE INVENTION

Field of the Invention

The exemplary embodiments of the present invention relate to a method and system for providing service based on space.

Discussion of the Related Art

Internet of Things (IoT) consists of an evolved form of the conventional Ubiquitous Sensor Network (USN) or Machine to Machine (M2M). Herein, the main purpose of the conventional M2M relates to performing communication between an end-device and a human being. However, the IoT extends its range of purpose and allows communication to be established between objects, which are commonly seen in our surroundings, such as telephone receivers, books, thermometers, and so on. More specifically, IoT may refer to connection network between objects and spaces, which establishes an intelligent relation enabling mutually cooperative sensing, networking, information processing, and so on, to be performed without any explicit human intervention with respect to three dispersed environmental elements, i.e., man (or human being), object, and service.

In addition to the above-described IoT, extensive research and development is being carried out on a wide range of concepts and technologies, such as Web of Things (WoT), Web of Objects (WoO), and so on. With the evolution and spreading of such concepts and technologies, the usage of devices (e.g., gadgets, sensor devices, actuators, and so on), which allow users to easily establish connection to the Internet, is expected to be increased.

With the advent of such IoT environment, the development of services that can control diverse IoT devices within a specific spatial environment is being required. For example, when assuming that a conference room of a smart building is being used, a user should be capable of controlling IoT devices in accordance with the purpose for using the corresponding conference room, or the IoT devices should be capable of automatically changing the temperature, ventilation settings, intensity of illumination (or brightness), sound, and so on in accordance with the current situation.

FIG. 1 illustrates a related art IoT environment. FIG. 1 shows an example of diverse IoT devices being included in a specific spatial environment 110. At this point, in the related art method, a user 120 may access a service of an individual IoT device by using his (or her) device, such as a smart phone, so as to control the individual service. For example, in order to control an IoT device, such as a smart lighting device, the user 120 may access a service related to the smart lighting device by using his (or her) device, thereby being capable of changing the brightness or tint (or color) of the smart lighting device.

However, in the related art method, the spatial environments diversely exist (e.g., home, office, conference room, and so on). And, considering the fact that multiple IoT devices exist in each of the spatial environments, the related art method is disadvantageous in that it is very troublesome and inconvenient for the users to access the individual services provided to each of the multiple IoT devices.

Additionally, the device of the user and each of the IoT devices only maintain a closed (or exclusive) or vertical relation between one another, information on the space between the devices is insufficient. For example, only a relation between a first IoT device and the device of the user and a relation between a second IoT device and the device of the user are used in the related art method, and whether or not the first IoT device and the second IoT device are included in the same space (e.g., one office) cannot be known. However, for example, in one space, correlated and/or integrated control is required to be performed on an air-conditioner, a boiler (or heating system), and a humidifier.

Furthermore, instead of using one space, multiple spaces are required to be linked (or connected) to one another. For example, devices installed at a building entrance and in conference rooms may be required to share information with one another, and devices installed in a living room and in bedrooms may be required to share information with one another. However, as described above, the related art method is disadvantageous in that, since the user only provides a service of an individual IoT device or individual control on IoT devices related to a single service, due to insufficient information on the spaces, interconnection (or link) between the spaces cannot be provided.

SUMMARY OF THE INVENTION

Accordingly, the present invention is directed to a method and system for providing a service based on space that substantially obviates one or more problems due to limitations and disadvantages of the related art.

An object of the present invention is to provide a method and system for providing a service based on space that can provide a service using a smart access point, which can interconnect and/or integrate IoT devices within a specific space, and that can connect each of multiple smart access points existing in multiple spaces to one another, thereby being capable of providing linked (or interconnected) service to one another within multiple spaces.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an aspect of the present invention, in a method for providing a service in a smart access point (AP) service platform, the method for providing a service includes the steps of registering multiple smart access points respectively included in multiple spaces— each of the multiple smart access points are connected to at least one Internet of Things (IoT) device that is further included in the corresponding space, providing first service control information to a first smart access point, in accordance with a request of the first smart access point, the first smart access point being accessed by a terminal of a user, among multiple access points, and providing second service control information to a second smart access point in accordance with a request of the second smart access point, when the terminal of the user accesses the second smart access point, among the multiple access points, and when the second smart access point recognizes a movement of the user.

According to an aspect of the present invention, at least one of the multiple registered smart access points may be identified by an E-mail address being assigned to the at least one registered smart access point, and the user or service related to the user may acquire control of space on the corresponding space, in accordance with a request made by using the assigned E-mail address.

According to another aspect of the present invention, a control of device on at least one IoT device may be provided to an external service, wherein the external service is provided to the user through an open Application Programming Interface (API), and the at least one IoT device corresponding to the provided control of device may be controlled based upon an input of the user respective to the external service.

In a method for providing a service in a smart access point (AP) service platform, the method for providing a service includes the steps of registering multiple smart access points respectively included in multiple spaces—each of the multiple smart access points are connected to at least one Internet of Things (IoT) device that is further included in the corresponding space, assigning an E-mail address respective to at least one smart access point among the multiple registered smart access points, and providing control of space on a space corresponding to the smart access point being assigned with the E-mail address to the user or service related to the user, in accordance with a request made by using the assigned E-mail address. According to an aspect of the present invention, the method may further include the steps of providing first service control information to a first smart access point, in accordance with a request of the first smart access point, the first smart access point being accessed by a terminal of a user, among multiple access points, and providing second service control information to a second smart access point in accordance with a request of the second smart access point, when the terminal of the user accesses the second smart access point, among the multiple access points, and when the second smart access point recognizes a movement of the user.

According to another aspect of the present invention, a service being provided through the first service control information and a service being provided through the second service control information may have service continuity between one another.

According to yet another aspect of the present invention, the method may further include the step of generating at least one location information of (1) physical location information of the multiple smart access points based upon a radio signal of the multiple smart access points, and (2) logical location information of the multiple smart access points based upon at least one of the physical location information, information inputted by users of the multiple smart access points, IP address of the multiple smart access points, and tag information of at least one IoT device connected to the multiple smart access points. Herein, the second service control information may be generated based upon spatial continuity between the first smart access point and the second smart access point, based upon the at least one location information.

According to yet another aspect of the present invention, the method may further include the steps of managing information on an IoT device being connected to the multiple smart access points, and providing the user with a service through an IoT device being connected to a smart access point, wherein the smart access point is accessed by a terminal of the user, and wherein, in case of an IoT device having an error or change occurred therein, among the connected IoT devices, the service is provided to the user by using another IoT device connected to the smart access point, or by using an IoT device connected to a smart access point belonging to another neighboring space, wherein the other neighboring space is located near the space corresponding to the connected smart access point.

In a system providing a service being realized through a smart access point service platform, the system providing a service includes a smart access point controller configured to register and authenticate multiple smart access points corresponding to multiple spaces, an exposure controller configured to provide internal and external interconnection interface functions respective to a service provided by the smart access point service platform and each of the multiple smart access points, a spatial smart access point controller configured to manage at least one location information of physical location information and logical location information of the multiple smart access points, and a resource controller configured to manage IoT devices connected to each of the multiple smart access point and available resource of an external service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
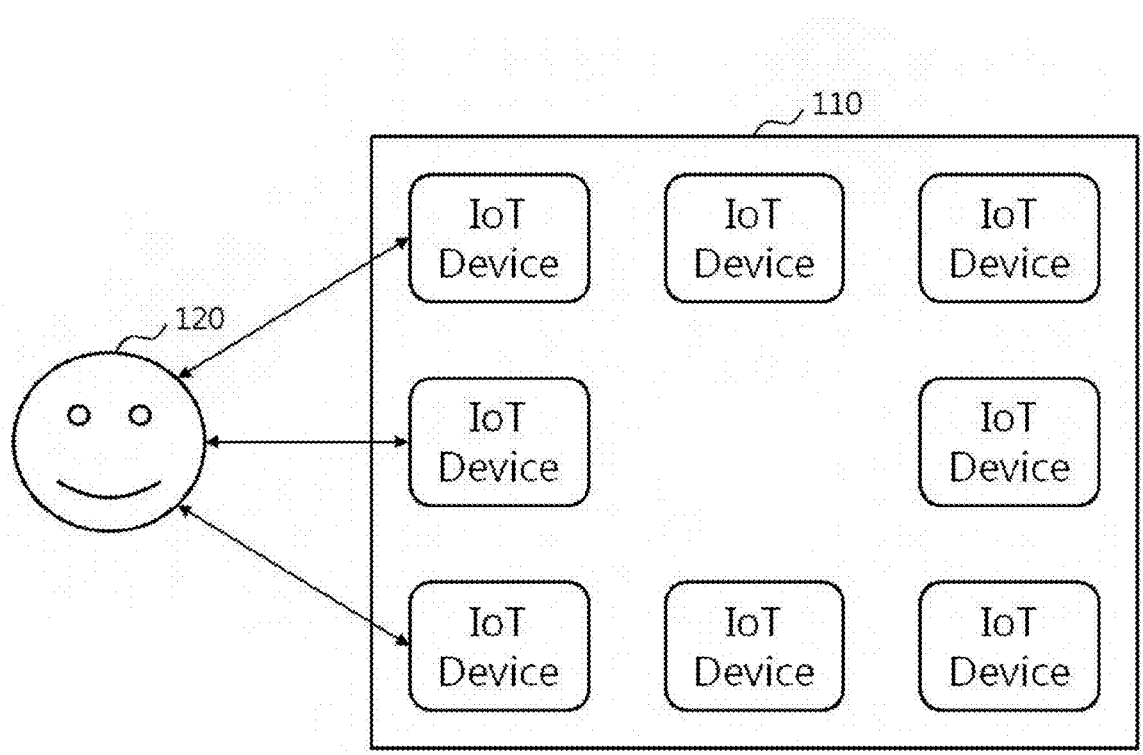
FIG. 1 illustrates a related art IoT environment.
Figure 2:
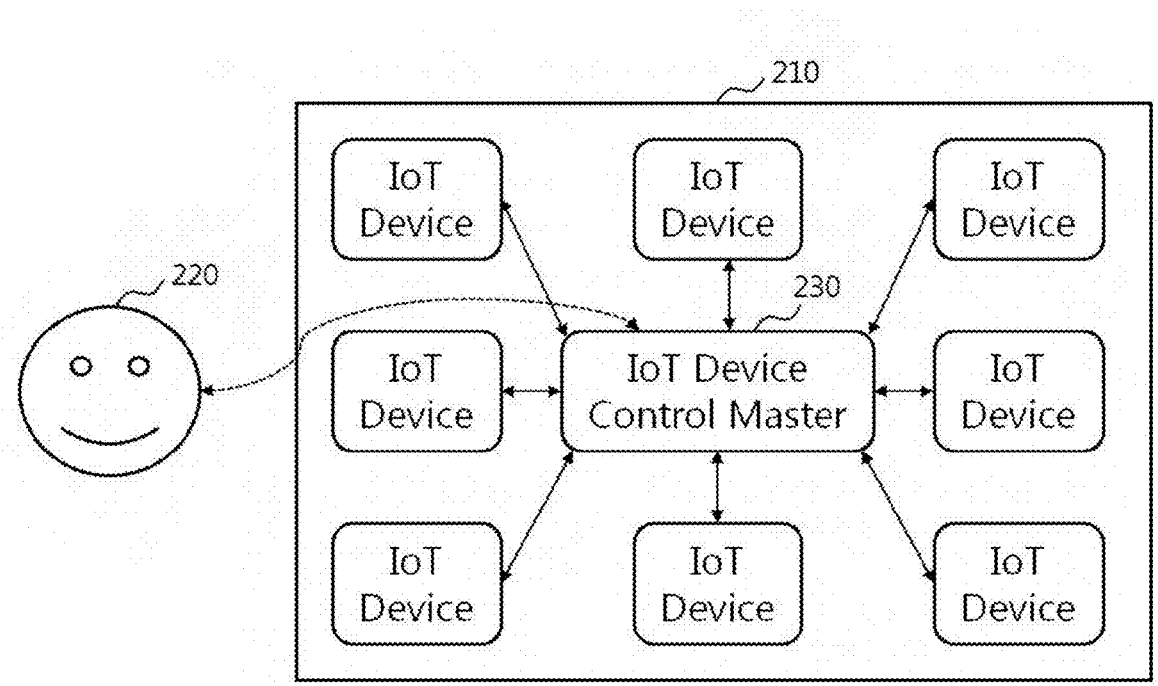
FIG. 2 illustrates an IoT environment according to an exemplary embodiment of the present invention.

FIG. 2 illustrates an IoT environment according to an exemplary embodiment of the present invention. FIG. 2 illustrates an example of diverse types of IoT devices being included in a specific spatial environment 210. Herein, instead of accessing services of each IoT device by using a device of a user 220 as described in the related art method, the user 220 may access an IoT Device Control Master 230, which is further included in the specific spatial environment 210.

The IoT Device Control Master 230 may provide the user 220 with a controlling service configured to control IoT devices existing in the corresponding space through the device of the user 220. In order to do so, as shown in FIG. 2, the IoT Device Control Master 230 may communicate with diverse IoT devices within the specific spatial environment 210.

As described above, in an object computing environment, an access point is being required in order to establish connection between an object device existing in a specific space and an object computing environment. And, the access point should be capable of supporting the access (or connection) of diverse IoT devices. In order to do so, in an environment, such as Internet of Things (IoT), Web of Things (WoT), Web of Objects (WoO), and so on, in addition to a network connection device (or network access point), an object computing environment for controlling and virtualizing an object device (IoT device) may be required. For example, the object computing environment may refer to an environment, which is configured to virtualize each IoT device and to operate each of the virtualized IoT devices.

In the exemplary embodiments of the present invention, a smart access point, such as the IoT device control master 230 of FIG. 2, may directly operate or control the accessed IoT devices. In this case, instead of being simply used as a network connection path, the function and significance of the access point should be changed to a smart access point, which is being used as a service execution environment for the connected (or accessed) IoT devices. A Virtual Object (VO) corresponding to diverse objects (e.g., IoT devices of FIG. 2) may be executed within the smart access point, and the user (e.g., user 220 of FIG. 2) may be capable of controlling the IoT devices through a connection with a wanted virtual object.

Figure 3:
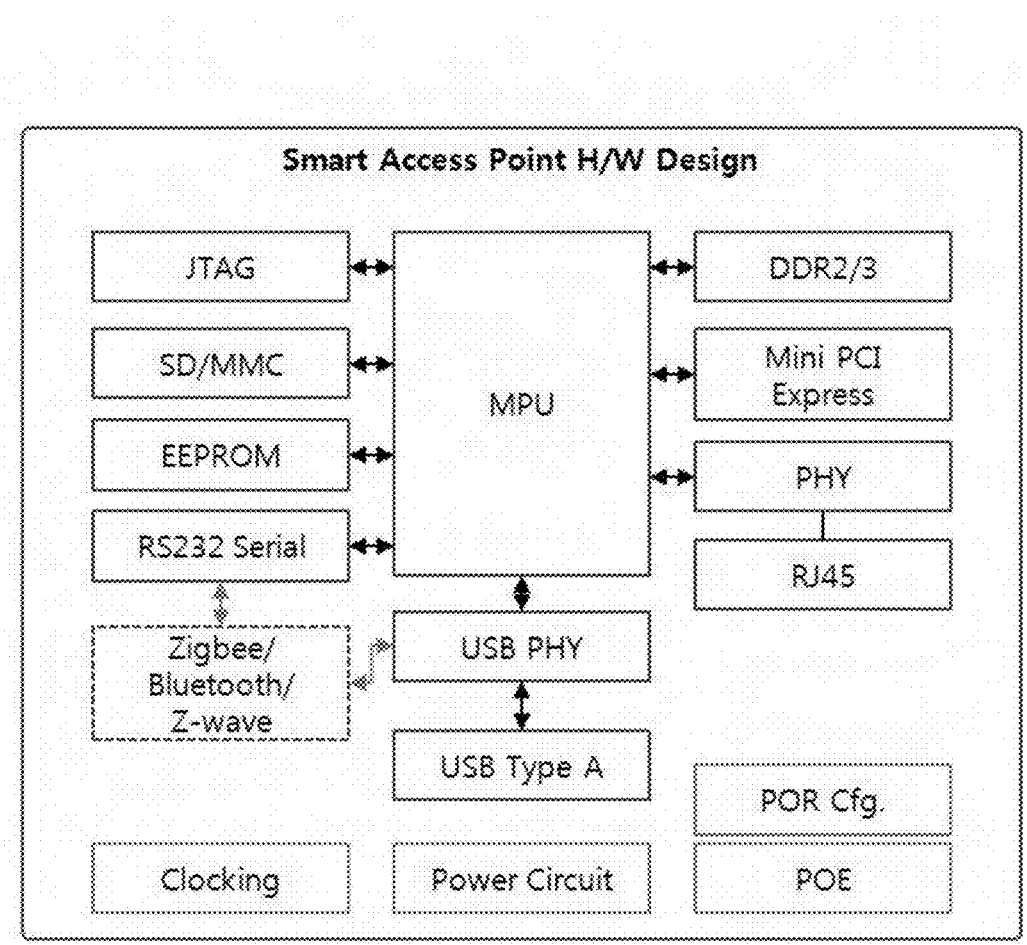
FIG. 3 illustrates an exemplary hardware configuration of a smart access point according to an exemplary embodiment of the present invention.

At this point, the smart access point may correspond to a device establishing one-hop (or single-hop) connection within an IoT device and providing a service, which is configured to operate virtualized IoT devices in the form of a virtual object. Such a smart access point may be equipped with an interface that is configured to be operated in connection with diverse IoT devices by using diverse communication protocols, such as Wireless Local Area Network (WLAN), Zigbee, Bluetooth, Z-wave, Ethernet, RS232 serial, and so on. FIG. 3 illustrates an exemplary hardware configuration of a smart access point according to an exemplary embodiment of the present invention. FIG. 3 shows configuration elements of Micro Processor Unit (MPU), Joint Test Action Group (JTAG), Secure Digital/Multi-Media Card (SD/MMC), Electrically Erasable and Programmable Read-Only Memory (EEPROM), RS232 Serial, Zigbee/Bluetooth/Z-wave, USB PHY, USB Type A, DDR2/3, Mini Peripheral Component Interconnect (PCI) Express, PHY, RJ45, Clocking, Power Circuit, Power On Reset (POR) Configuration (Cfg.), Power Over Ethernet (POE), and so on. Herein, since each configuration element is already well-known, detailed description of the same will be omitted for simplicity. Additionally, FIG. 3 merely illustrates an exemplary hardware configuration of the smart access point. And, therefore, the smart access point be further equipped with additional elements that are not shown in FIG. 3, or the smart access point may be configured to have some of the elements omitted from the smart access point, or to have two or more elements combined and positioned in the smart access point.

IoT devices accessing a single smart access point may be considered to belong to a single space. If multiple spaces exist, in order to establish connection between the multiple spaces, the smart access point (AP) of each space may communicate with one another by being interconnected by a Smart AP service platform, which corresponds to a control-dedicated service platform.

An exemplary service scenario will be described as follows.

(1) User A being identified by an e-mail address of 'aaa@abc.com' and User B being identified by an e-mail address of 'bbb@def.re.kr' wish to have a meeting in a conference room of Building C on Wednesday at 3:00 p.m.

(2) User A may invite User B (by using the identifier 'bbb@def.re.kr' of User B) and may reserve Conference Room A313 of Building C through a Calendar service by using the smart phone of User A. Herein, Conference Room A313 of building C may be identified by an e-mail address of 'CA313@thingsgate.com', which corresponds to space matching identifier of the respective conference room. And, by inviting the e-mail address 'CA313@thingsgate.com' through the Calendar service, Conference Room A313 may be reserved by User A. At this point, management of IoT devices that are included in the space of Conference Room A313 and management of the related services may be carried out by a smart access point belonging to Conference Room A313. In order to allow users to easily use Conference Room A313 in a cooperative environment, such smart access point may be assigned with the above-described e-mail address of 'CA313@thingsgate.com'.

(3) As User B arrives in front of Building C, as soon as a Wi-Fi signal of Building C is received by the smart phone of User B, a welcoming message of an access information service (or connection information service) of Building C may be exposed to (or displayed on) the smart phone of User B. If User B responds to such welcoming message, reservation information that has been prearranged through the Calendar service may be notified to the smart phone of User B.

(4) User B may then move on to Conference Room A313 by being provided with a Wi-Fi signal based location guidance through the smart phone of User B. And, while User B is moving to Conference Room A313, automatic authentication of all doors located along the path may be realized, thereby allowing User B to pass through all doors in order to reach Conference Room A313 without any separate ID tag. In (3) and (4), smart access points of each individual space may be connected to one another through a smart access point service platform. Accordingly, once User B is authenticated at the entrance of Building C, the corresponding authentication information is shared by all smart access points through the smart access point service platform, thereby reducing the complexity in sequential authentication procedures of the smart access points, which are connected to one another along the movement path of User B. Furthermore, in providing services to User B, service information between the smart access points being sequentially accessed by the smart phone of User B may be shared through the smart access point service platform.

(5) When User B enters Conference Room B, lights and lamps installed in the conference room may be automatically turned on, and operation of a ventilation system may be initiated. Thereafter, when User A enters Conference Room A313, a projector may be turned on, blinders of the conference room windows may be shut, and the lights may be turned off. In addition to such automatic services of the IoT devices, the users may be capable of controlling the specific space by using IoT applications existing within the smart access points of the corresponding space.

As described in the exemplary scenario presented above, the need for sequential provision of spatial intelligence service between smart access points is increasing, and a service that can recognize and track situational changes in persons, objects, and devices within a corresponding space should be provided. For example, the service should be capable of supporting interconnected functions with diverse multi-modal sensors. And, such service should be provided with a function that can manage spatial sensors and IoT devices through an object, which is configured to have a virtualized format, in a distributed environment and a function that can reconfigure a dynamic virtual environment in accordance with situational changes.

Process steps for service provision will be described as follows.

1. Spatial situation information is acquired by each individual smart access point, and the acquired spatial situation information may be processed based upon a virtualized object.

2. A smart access point may deliver information on user access and pre-defines events to a smart access point service platform, which corresponds to an upper-level service platform.

3. The smart access point service platform searches for a customized spatial intelligence service in accordance with the characteristic of an event, and the smart access point service platform may provide control information for providing such customized spatial intelligence service to the corresponding smart access point.

4. Each individual smart access point may provide the users with service continuity and device interconnection services by controlling the virtualized objects.

Initial access recognition of a user device (or user equipment) may be verified by using diverse methods. For example, in case of using a Bluetooth beacon, it will be advantageous in that service invoke can be available based on low power. In case of using Wi-Fi, devices that do not support Bluetooth 4.0 may be supported, and it will be advantageous in that the Wi-Fi can be applicable to mode terminals (or equipments).

In case of a Bluetooth smart device or a smart ready device, Bluetooth-based service invoke may be carried out by using a method of waking up a service within a Handset of a user through a beacon, after installing a beacon module at locations where service invoke mostly occurs.

The initial access recognition of a user equipment (or user terminal), which is carried out by the smart access point, may be carried out by determining whether or not a terminal, which initially accesses the Wi-Fi, corresponds to a service target.

Figure 4:
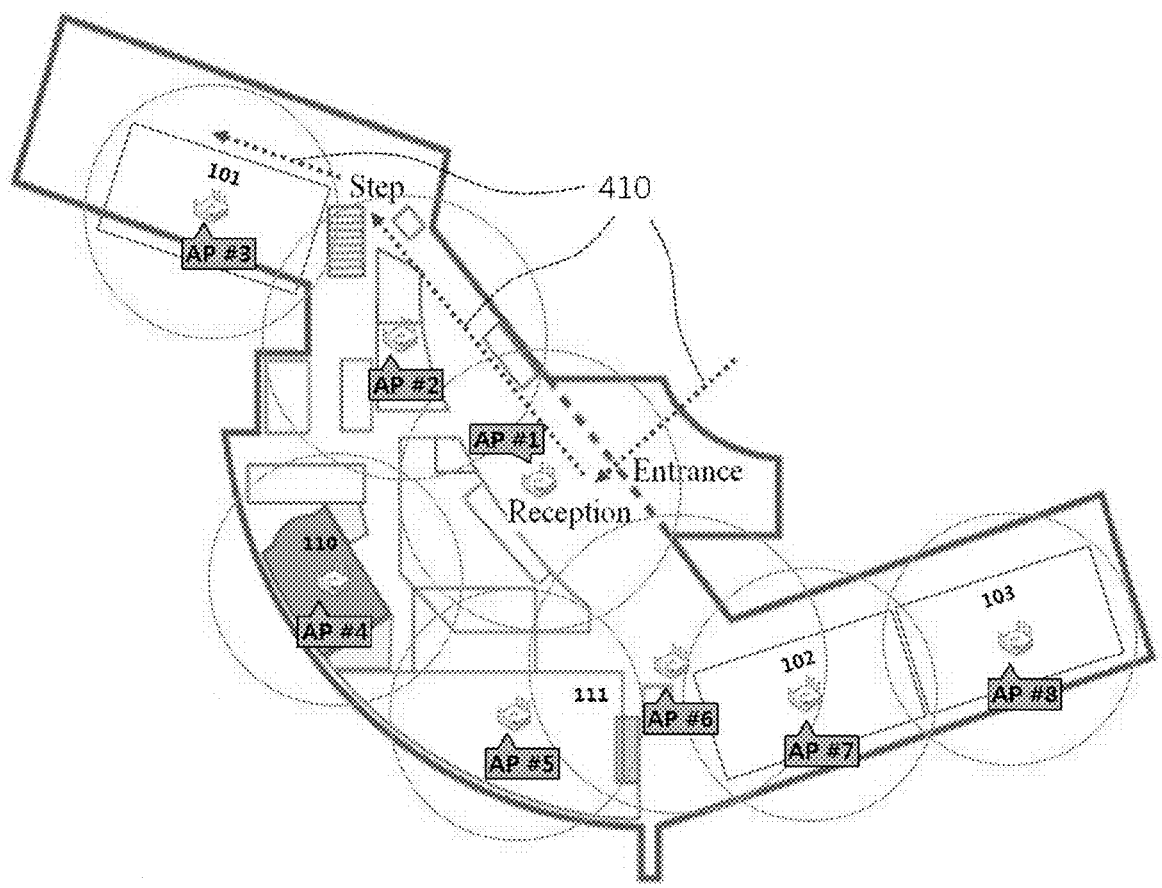
FIG. 4 illustrates an exemplary structure of a building configured of multiple spaces according to an exemplary embodiment of the present invention.

FIG. 4 illustrates an exemplary structure of a building configured of multiple spaces according to an exemplary embodiment of the present invention. And, FIG. 5 illustrates an example of providing services through a connection between multiple spaces according to an exemplary embodiment of the present invention.

FIG. 4 illustrates an exemplary cross-sectional view of Floor 1 in a building. And, FIG. 4 shows an exemplary positioning of smart access points (Smart APs) each being identified as AP #1, AP #2, AP #3, AP #4, AP #5, AP #6, AP #7, and AP #8. Herein, dotted arrows 410 represent a movement path, which the user takes to get to Conference Room 101 after passing through the entrance. In this case, the terminal (or equipment) of the user accesses each of a smart access point AP #1 of the 'Reception', a smart access point AP #2 within the path, and a smart access point AP #3 of Conference Room 101.

Figure 5:
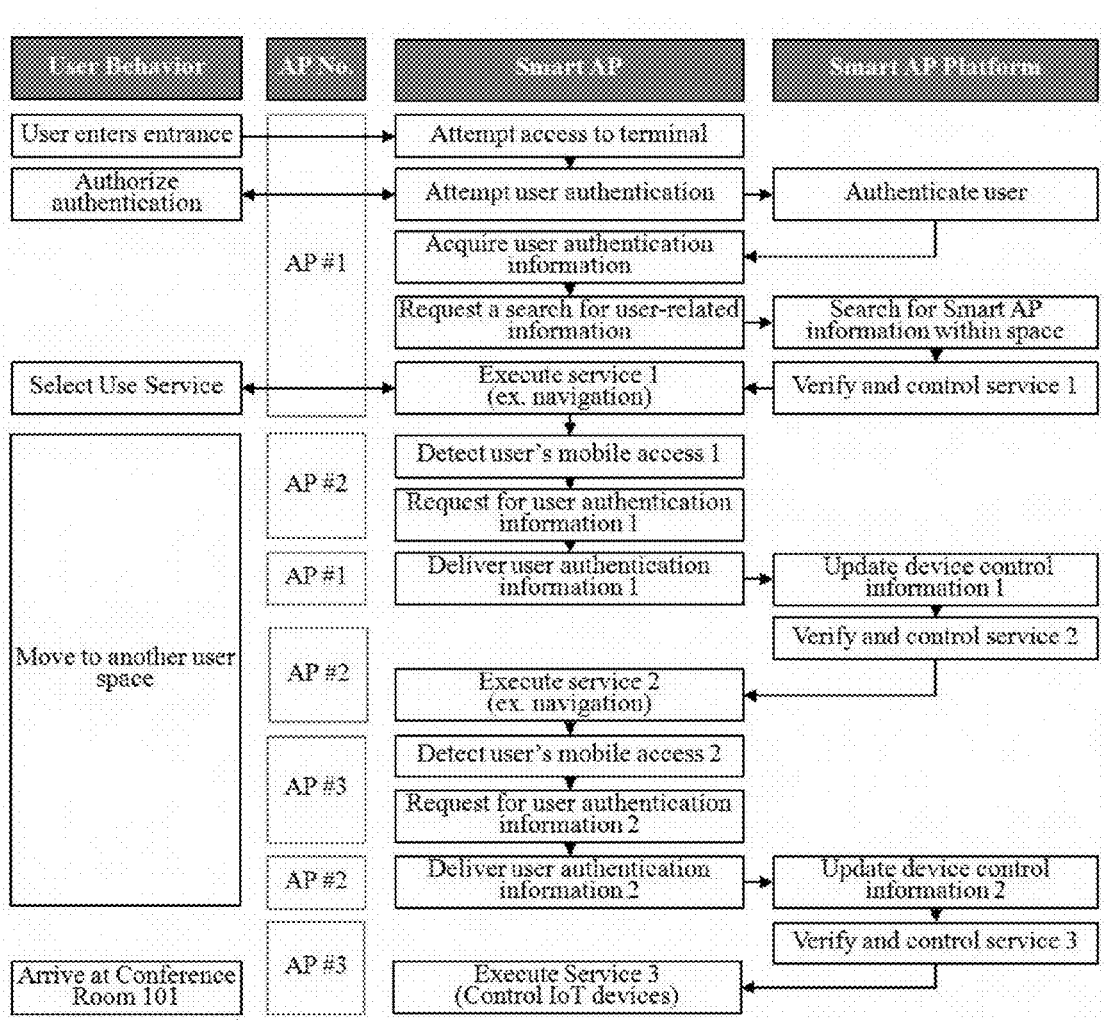
FIG. 5 illustrates an example of providing services through a connection between multiple spaces according to an exemplary embodiment of the present invention.

FIG. 5 illustrates a flow chart showing how the smart access points AP #1, AP #2, and AP #3 operate in accordance with user behavior, starting from the point when the user arrives at the entrance of the building to the point when the user reaches Conference Room 101.

When a user behavior of 'User enters entrance' occurs, the smart access point AP #1 may perform a step of 'Attempt access to terminal'. For example, in FIG. 4, in case the user enters the 'Entrance' of the building, and when a Wi-Fi signal of the user's terminal is detected, the smart access point AP #1 may attempt to access (or establish connection with) the user's terminal.

At this point, in case a connection is established between the user's terminal and the smart access point AP #1, the smart access point AP #1 may perform a step of 'Attempt user authentication'. For example, the smart access point AP #1 may transmit a message for verifying whether or not authentication is authorized to the user's terminal. Herein, in case a user behavior of 'Authorize authentication' occurs, the smart access point AP #1 may request the smart access point (AP) platform for a user authentication.

After receiving the request for user authentication, the smart AP service platform may perform a step of 'Authenticate user', and, in case the user is authenticated, the smart AP service platform may provide the user authentication information to the smart access point AP #1 having requested for the user authentication. In this case, the smart access point AP #1 may perform a step of 'Acquire user authentication information'.

Additionally, the smart access point AP #1 may perform a step of 'Request a search for user-related information'. For example, the smart access point AP #1 may inquire the smart AP service platform on whether or not information related to the authenticated user exists. In this case, the smart AP service platform may perform a step of 'Search for Smart AP information within space' and a step of 'Verify and control service 1'. For example, the smart AP service platform may verify that the user has reserved Conference Room 101 through the smart access point AP #3 of Conference Room 101. And, then, after verifying a service for guiding the user to Conference Room 101, the smart AP service platform may control the smart access point AP #1.

The smart access point AP #1 may perform a step of 'Execute service 1'. For example, the smart access point AP #1 may provide a service list, which can be provided based upon information being provided from the smart AP service platform, to the user's terminal. At this point, in case a user behavior of 'Select Use Service' occurs, the smart access point AP #1 may provide the selected service to the user. For example, when a service for providing guidance to Conference Room 101 is selected by the user's terminal, the smart access point AP #1 may provide the user's terminal with information guiding the user to Conference Room 101.

When a user behavior 'Move to another user space' occurs, and when the user enter a space of the smart access point AP #2, the smart access point AP #2 may perform a step of 'Detect user's mobile access 1' and a step of 'Request for user authentication information 1'. For example, after verifying that the corresponding user has performed mobile access through the smart access point AP #1, the smart access point AP #2 may request the smart access point AP #1 for the user's authentication information.

At this point, the smart access point AP #1 may perform a step of 'Deliver user authentication information 1'. For example, the smart access point AP #1 may transmit user authentication information, which is received from the smart AP service platform, to the smart access point AP #2.

Moreover, the smart access point AP #1 may notify the smart AP service platform that the smart access point AP #1 has delivered the user authentication information to the smart access point AP #2, and the smart AP service platform may perform a step of 'Update device control information 1' and a step of 'Verify and control service 2'. For example, the smart AP service platform may verify that the user has entered the space respective to the smart access point AP #2. Then, the smart AP service platform may verify an available service, which can be provided through the smart access point AP #2, and then provide the smart access point AP #2 within information for controlling the smart access point AP #2.

In this case, the smart access point AP #2 may perform a step of 'Execute service 2'. For example, the smart access point AP #2 may provide the user's terminal with information guiding the user to Conference Room 101.

In case the user continues to move toward Conference Room 101, and in case a user behavior of 'Arrive at Conference Room 101', wherein the user enters the space of the smart access point AP #3, the smart access point AP #3 may perform a step of 'Detect user's mobile access 2' and a step of 'Request for user authentication information 2', and the smart access point AP #2 may perform a step of 'Deliver user authentication information 2'. Similarly, the smart AP service platform may perform a step of 'Update device control information 2' and a step of 'Verify and control service 3'. At this point, the smart access point AP #3 may perform a step of 'Execute Service 3'. For example, the smart access point AP #3 may control the IoT devices included in Conference Room 101, so that the lights can be automatically turned on, and so that the operation of the ventilation device or cooling/heating device (or air-conditioning device) can be initiated.

Figure 6:
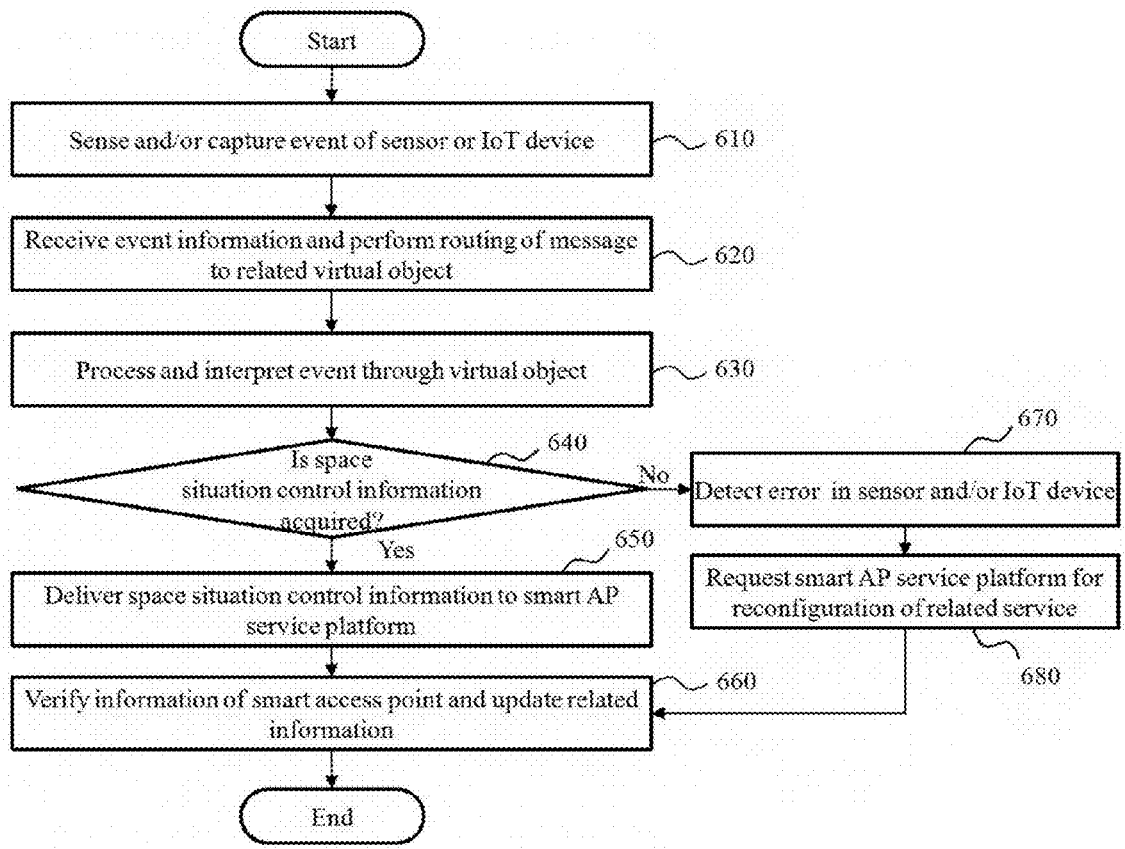
FIG. 6 illustrates a flow chart showing a procedure for receiving spatial situation information, which is sensed by the smart access point, according to an exemplary embodiment of the present invention.

FIG. 6 illustrates a flow chart showing a procedure for receiving spatial situation information, which is sensed by the smart connection device, according to an exemplary embodiment of the present invention.

In step (610), a smart access point may sense and/or capture an event of a sensor or an IoT device.

In step (620), the smart access point may receive event information and may perform routing of a message to a related virtual object. The smart access point may perform a function of routing an input/output message related to sensors and/or IoT devices. At this point, as described above, the sensors and/or IoT devices may be managed by the smart access point as virtualized objects.

In step (630), the smart access point may process and interpret an event through a virtual object. For example, in the information being provided by each virtual object, data type (e.g., unit) of the individual information may be explicitly pre-determined. At this point, the smart access point may collect information related to the virtual object using the same unit based upon such data type. Then, after adding weight to the collected information, the smart access point may use the processed value. Thereafter, when a physical problem occurs in a specific sensor and/or IoT device, or when a problem occurs in data reception, the processed information may be replaced with information of another sensor and/or IoT device belonging to a neighboring smart access point. For example, when the smart access point receives different temperature information from two or more sensors and/or IoT devices, the smart access point may verify the average value of each temperature information value having weight added thereto as the current temperature. In another example, when the smart access point detects any physical problem in the temperature sensor or any problem in the communication with the temperature sensor, the smart access point may receive and user temperature values, which are received from another temperature sensor belonging to another neighboring smart access point, through the other neighboring smart access point.

Example of data units are shown below in Table 1.

TABLE 1

| Data type (unit) | Description | Icon Display |
| --- | --- | --- |
| percent | percentage | % |
| onoff | on/off state of power | Control Icon |
| celsius | temperature | ° C. |
| lockunlock | lock/unlock state of doors or other devices | Control Icon |
| lux | Brightness of lighting | Lux |
| kcal | heat energy | Kcal |
| cal | heat energy | Cal |
| liter | Amount of water | L |
| Milliliter | Amount of water | ml |
| Openclosed | Open/closed state information of door or device | Control Icon |
| Kilowatt | Power consumption information | Kw |
| Watt | Power consumption information | w |

In step (640), the smart access point may decide whether or not space situation control information is acquired. At this point, in case the space situation control information is acquired, the smart access point may perform step (650), and, in case the space situation control information is not acquired, the smart access point may perform step (670).

In step (650), the smart access point may deliver the space situation control information to the smart AP service platform.

In step (660), the smart AP service platform may verify the information of the smart access point and may update the related information.

In step (670), the smart access point may detect error (or malfunction) in the sensor and/or IoT device.

In step (680), the smart access point may request the smart AP service platform for a reconfiguration of the related service. After step (680), the smart access point may perform step (660).

Figure 7:
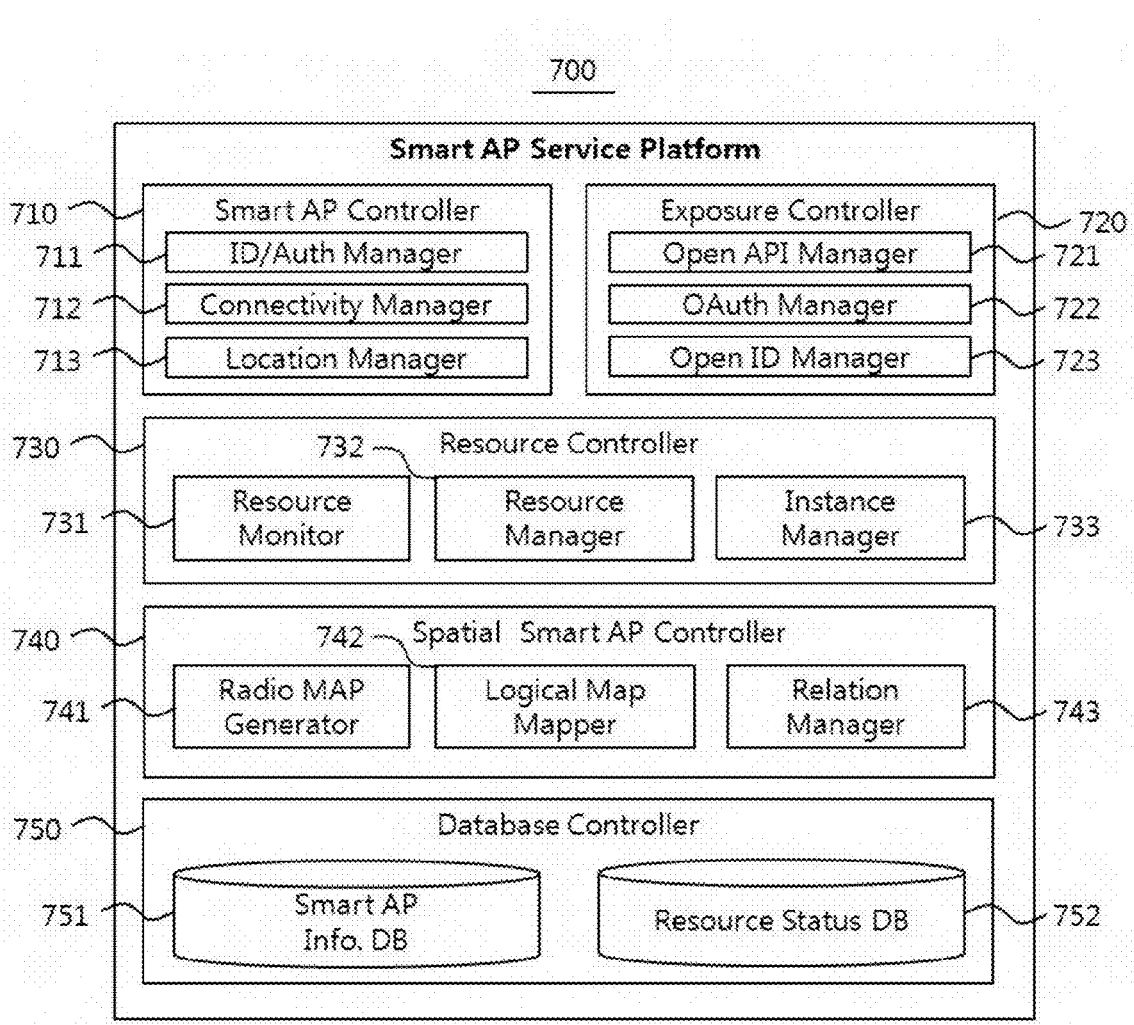
FIG. 7 illustrates a block view for describing an exemplary internal configuration of a smart access point service platform according to an exemplary embodiment of the present invention.

FIG. 7 illustrates a block view for describing an exemplary internal configuration of a smart connection device platform according to an exemplary embodiment of the present invention. As shown in FIG. 7, a smart AP service platform 700 according to the exemplary embodiment of the present invention may include a Smart AP Controller 710, an Exposure Controller 720, a Resource Controller 730, a Spatial Smart AP Controller 740, and a Database Controller 750.

The smart AP controller 710 may register and authenticate a smart access point (AP). For example, the smart AP controller 710 may provide a function of authenticating a device, which is equipped with a wireless router or gateway instance hosting function, and a function of collecting access location information. Herein, the wireless router or gateway instance hosting function may include a function allowing the smart access point to route messages between virtual objects corresponding to IoT devices or to manage an instance corresponding to a virtual object.

Such smart access point controller 710 may include an identification/authentication manager (ID/Auth Manager) 711, which is configured to assign an identifier (ID) to a smart access point, based upon unique information (e.g., MAC) of the corresponding smart access point, when a connection (or access) of the smart access point is established, a Connectivity Manager 712, which is configured to manage a connection of a smart access point, a Location Manager 713, which is configured to manage location information of a smart access point, based upon an IP address and a user (e.g., manager) input information. At this point, the connectivity manager 712 may include a function for managing a continuous connected state even when using a dynamic IP address.

Examples of a list of information being collected in relation to data input and output, at a point when a smart access point is being registered, and information related to the device status are shown below in Table 2.

TABLE 2

| Device H/W, S/W information | Information related to device status |
| --- | --- |
| MAC Address | Radio Interference information |
| IP Address | IoT application installation information |
| Wireless Interface | IoT device connection information |
| CPU Clock | IoT device resource usage information |
| Memory | — |
| Flash Storage | — |
| OS codename and version | — |
| Instance manager version | — |

Herein, the instance manager may correspond to a module, which is configured to execute a process for a service logic that can be executed with respect to resources (e.g., IoT devices) related to the smart access point and to deliver messages generated by the process to another process or to another resource and to manage such messages.

The radio interference information may be acquired by having the smart AP controller 710 periodically collect the information with respect to surrounding radio signals and Service Set Identifiers (SSIDs).

The IoT application installation information may include information, such as application profile, application title, tag, data unit, and so on, and the IoT device connection information may be determined by using a minimum access verification cycle period based upon the application profile of the IoT application installation information.

In case the smart access point has a 1) space control function and an 2) IoT device control function of a specific spatial area in the form of a Master, the location manager 713 may provide a function for managing control of resource (i.e., a specific service (or user) based upon a time table) respective to the corresponding space. For example, in case a smart access point installed in Conference Room 238 exists, when carrying out its registration to the smart AP service platform 700, the corresponding smart access point may also register information on the control of resource to the smart AP service platform 700. And, the location manager 713 may issue (or assign) an E-mail address respective to the control of space respective to the space corresponding to Conference Room 238. Thereafter, the user may gain the control of space of Conference Room 238 by using the issued (or assigned) E-mail address.

The exposure controller 720 may use an IoT application of an individual smart access point, an IoT interconnection application of a third party ($3^{rd}$ Party),) an IoT device connected to the smart access point, and spatial situation control information. For example, the exposure controller 720 may provide an internal/external interconnection interface function respective to service functions, which are provided by the smart AP service platform 700 and the individual smart access point.

The exposure controller 720 may include an Open API Manager 721, an Authentication Manager (OAuth Manager) 722, and an Open ID Manager 723.

The open API manager 721 may provide functions of performing authentication, logging, data interconnection, and so on, on diverse interface information that are provided in open API formats. At this point, a virtual object based service, which is connected to the smart access point, may generate an open API, which is disclosed through the smart AP service platform 700.

The Authentication Manager (OAuth Manager) 722 may provide an OAuth based user and service authentication function. The 'OAuth' corresponds to a standard authentication method, which is developed as an open API, and the 'OAuth' may be used when user authentication is to be performed in each application. Since the 'OAuth' is already well-known, detailed description of the same will be omitted for simplicity.

The open ID manager 723 may provide an open ID based user and service authentication function. Since the open ID is also well-known, detailed description of the same will also be omitted for simplicity.

In case an E-mail address is assigned to a smart access point, in order to provide a service based on space to the corresponding smart access point, an OAuth or an open ID may be used to authenticate the corresponding smart access point. Additionally, in case of using a device control service of the smart access point, in addition to a method of allowing access by authenticating the smart access point using open API, the smart access point may be authenticated to the device control service within the smart AP service platform 700 by using OAuth or open ID, or the smart access point may be directly authenticated.

The resource controller 730 may manage resources of the smart access point and resources of an IoT device connected to the smart access point and may directly execute a related service. The resource controller 730 may provide a function of managing available resources respective to sensing and controlling devices, which are connected to individual smart access points, and interconnected external services (e.g., an external service for controlling IoT device through an open API). Additionally, the resource controller 730 may provide related information in situations, such as movement of service between smart access points, verification of spatial service availability (or availability of service based on space) for a corresponding smart access point received from an external service. And, the resource controller 730 may also provide a function of responding to diverse error situations by monitoring individual resource.

The resource controller 730 may include a Resource Monitor 731, a Resource Manager 732, and an Instance Manager 733.

The resource monitor 731 may provide a function of detecting problems or changes in the corresponding sensor or IoT device by consistently monitoring resource information, and a function of maintaining a related service by using a similar device or other neighboring devices.

The resource manager 732 may provide a function of managing IoT devices that are registered to the smart access point and a function of managing space information. And, the resource manager 732 may update information on a corresponding device (i.e., smart access point device) and information on the respective space, which are received from the smart access point, in the resource status database (DB) 752.

In case a service for controlling space and device is being provided from the smart AP service platform 700, the instance manager 733 may provide a function of calling the corresponding service.

The resource status data may include information on the smart access point (e.g., information on units of data being generated from an IoT application) and information on a space of a smart access point (a service function being provided from the smart AP service platform 700). For example, information on a main space of the smart access point may include information, which is received when an E-mail address of the smart access point is being assigned (or issued) (e.g., address information of the corresponding space, position information of a space existing in a building, nickname for space information, space information manager account, application information of spatial information, and so on.)

The spatial smart AP controller 740 may manage spatial situation control information in accordance with physical, logical, and relative perspectives between smart access points. The spatial smart AP controller 740 may combine information on the connected smart access point, so as to generate a logical/physical map between the smart access points, and, based upon the generated Map, the spatial smart AP controller 740 may provide a function of determining whether or not mutual control between resources of the smart access points has been performed based upon the generated map. At this point, the spatial smart AP controller 740 may include a Radio Map Generator 741, a Logical Map Mapper 742, and a Relation Manager 743.

The radio map generator 741 may configure spatial information (radio map information (physical location information of the smart access point)) between smart access points in an explicit format (by using location information registered by the user (manager)) or in an implicit format based upon a radio signal.

The logical map mapper 742 may provide a function of combining diverse information that can identify locations, such as radio map information, user input information, IP address, tag information of devices registered to the smart access point, and so on, and mapping location information of the smart access point to a location of an actual environment (Geographic Information System (GIS) information) and to a relative location within individual buildings.

The relation manager 743 may provide a function of establishing relations between each of the resources based upon information on sensors and/or IoT devices, which are respectively registered to each smart access point. For example, the relation between resources may be used for searching replaceable information, when an interference or malfunction is detected, or may be used for transmitting available control information that can be connected to a neighboring smart access point, when an event corresponding to the user's movement occurs, in order to provide service continuity, and for verifying whether or not the corresponding service function is available for usage.

For example, in case the smart access point detects an interference (or problem) in the sensors and/or IoT devices, the smart access point may request the smart AP service platform 700 for a reconfiguration of the related service. At this point, the smart AP service platform 700 may replace and use information on the sensors or IoT devices, which belong to the same smart access point or to a neighboring smart access point, and which have the same or similar information as the already-existing sensors and/or IoT devices, based upon the information generated by the spatial smart AP controller 740.

The database controller 750 may store and manage individual information. The database controller 750 may include a smart access point information database (Smart AP Info. DB) 751 and the above-described resource status database (Resource Status DB) 752.

Figure 8:
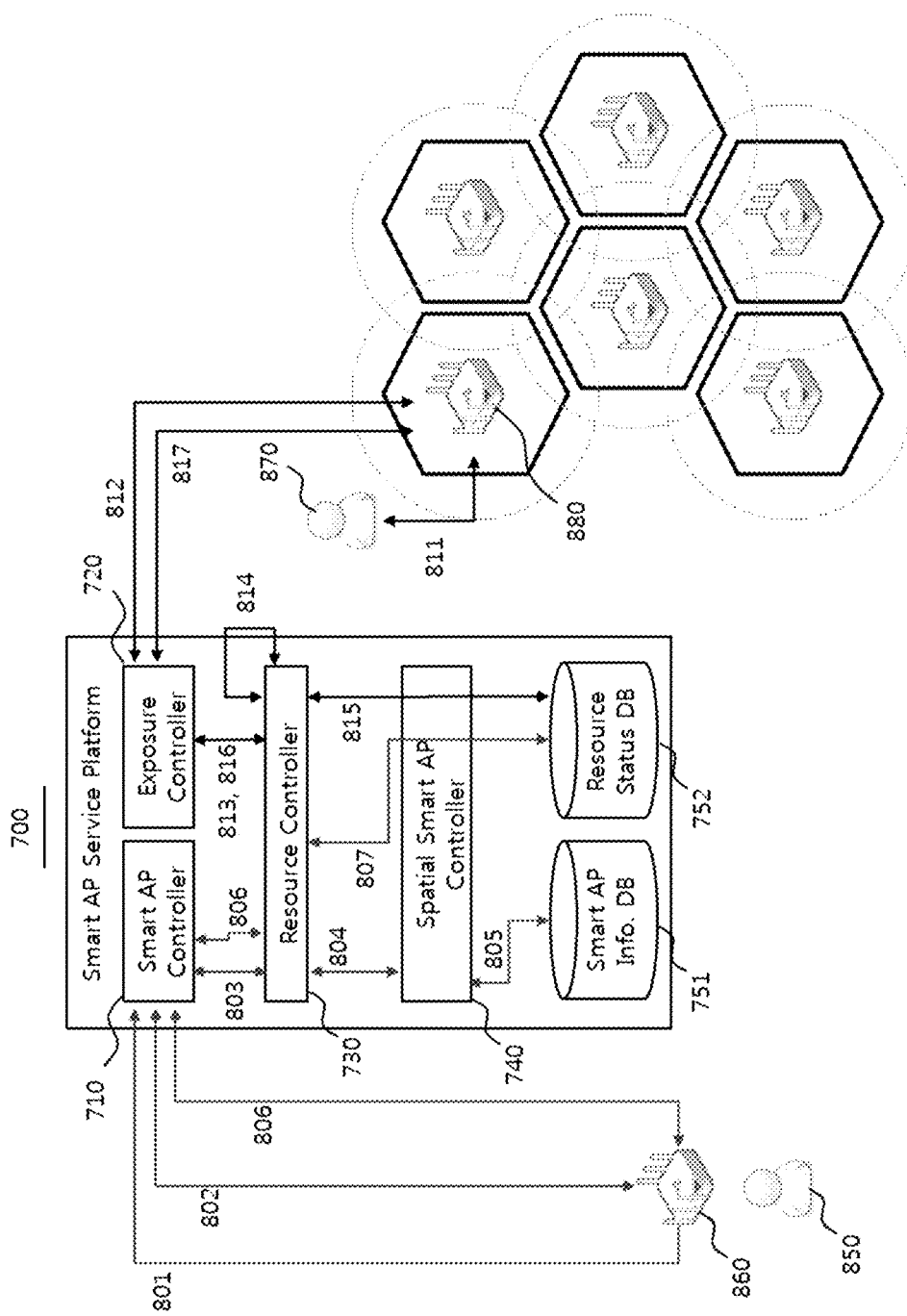
FIG. 8 and FIG. 9 illustrate examples for describing a method for providing a service according to an exemplary embodiment of the present invention.
Figure 9:
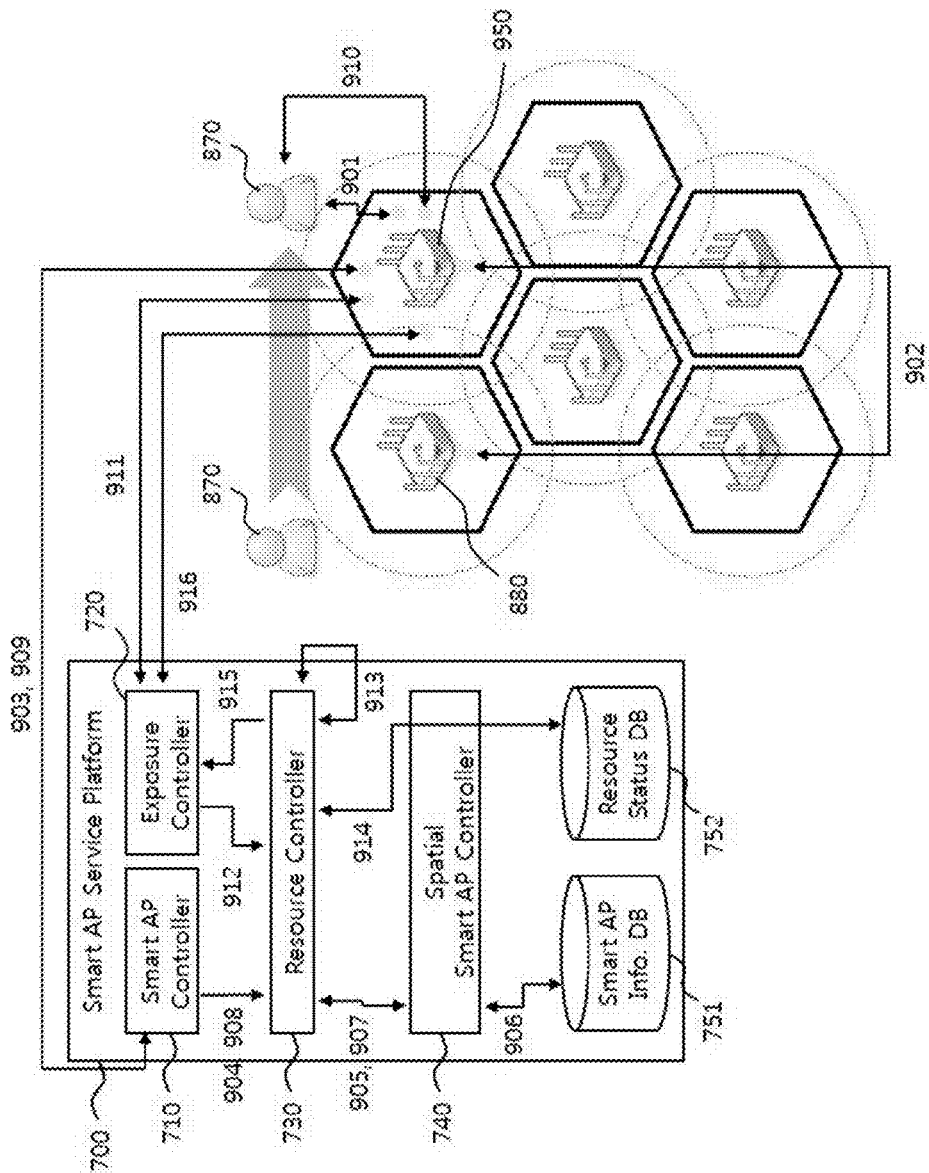

FIG. 8 and FIG. 9 illustrate examples for describing a method for providing a service according to an exemplary embodiment of the present invention.

Referring to FIG. 8, step (801) to step (807) show an exemplary procedure for performing initial user access, authentication, and registration of information on devices linked to smart access points.

In step (801), the smart access point (or device) 860 of the user 850 may request for a user device registration to the smart AP service platform 700. The user device registration request may be processed by the smart AP controller 710. Herein, the user 850 may be the manager of the smart access point 860.

In step (802), the device 860 of the user 850 may transmit information related to the smart access point. For example, in accordance with the request for a user device registration, the smart AP service platform 700 may request the smart access point 860 to provide information related to the smart access point. And, with respect to such request, the smart access point 860 may provide the smart AP service platform 700 with the requested information related to the smart access point.

In step (803), the smart AP controller 710 may request the resource controller 730 for the registration of the smart access point 860.

In step (804), the resource controller 730 may request the spatial smart AP controller 740 to analyze the location of the smart access point 860 and the related information and to update the information related to the smart access point.

In step (805), the spatial smart AP controller 740 may register the smart access point 860 to the smart AP information database 751.

In step (806), the smart AP controller 710 may request interconnected (or linked) device information to the smart access point 860, and, then, the smart AP controller 710 may request the resource controller 730 to analyze the received interconnected device information.

In step (807), the resource controller 730 may analyze the interconnected device information, and, then, the resource controller 730 may register the analyzed interconnected device information to the resource status database 752.

Referring to FIG. 8, step (811) to step (817) show an exemplary service controlling procedure.

In step (811), when the terminal of the user 870 approaches one user access point 880 among multiple registered user access points, the user access point 880 may request the terminal of the user 870 for user information authentication.

In step (812), the user access point 880 may request the smart AP service platform 700 for user information authentication. For example, the user information authentication may be processed by the exposure controller 720.

In step (813), the exposure controller 720 may request for a service to the resource controller 730.

In step (814), the resource controller 730 may search for and extract available service information, which can be provided based upon user information.

In step (815), the resource controller 730 may verify resource availability status of devices that are required for providing service through the resource status database 752.

In step (816), the resource controller 730 may send a response to the service request to the exposure controller 720.

In step (817), the exposure controller 720 may control the user access point 880 for the related service.

Referring to FIG. 9, step (901) to step (916) show an exemplary procedure for providing service in accordance with spatial movements of the user.

In step (901), as the user 870 moves, the smart access point 950 may detect the access of the terminal of the user 870.

In step (902), by communicating with the smart AP 880, the smart AP 950 may recognize that the user 870 has moved from the space of the smart AP 880 to the space of the smart AP 950.

In step (903), the smart AP 950 may request for service information to the smart AP service platform 700 for service continuity. At this point, such request may be requested to the smart AP controller 710.

In step (904), the smart AP controller 710 may request the resource controller 730 for service information.

In step (905), the resource controller 730 may request the spatial smart AP controller 740 for verification as to whether or not an interconnected service is available.

In step (906), the spatial smart AP controller 740 may request the smart AP information database 751 for service provision information within the smart AP 950, and, then, the spatial smart AP controller 740 may receive a respective response from the smart AP information database 751.

In step (907), the spatial smart AP controller 740 may respond to an acknowledgement (or verification) respective to whether or not an available interconnected service can be provided to the resource controller 730 based upon a response received from the smart AP information database 751.

In step (908), the resource controller 730 may send a response to the request for service information to the smart AP controller 710.

In step (909), the smart AP controller 710 may send a response to the request for service information for service continuity to the smart access point 950.

In step (910), the smart access point 950 may send an inquiry to the terminal of the user 870 as to whether or not the user wishes to continue using a continued service, and the smart access point 950 may also receive the respective response from the terminal of the user 870.

In step (911), in case the smart access point 950 receives a response accepting the continued usage of a continued service from the terminal of the user 870, the smart access point 950 may request the exposure controller 720 for service control.

In step (912), the exposure controller 720 may request the resource controller 730 for service control.

In step (913), the resource controller 730 may search for and extract service information that is available for linked provision.

In step (914), the resource controller 730 may verify resource availability status of devices, which are required for service provision, by searching the resource status database 752.

In step (915), the resource controller 730 may send a response to the service control request made by the exposure controller 720.

In step (916), the exposure controller 720 may send a response to the service control request made by the smart access point 950. At this point, the smart access point 950 may be capable of providing the user 870 with a continued service by using service related information, which is provided from the exposure controller 720.

The above-described spatial situation control information corresponds to service information that can be generated by the smart AP service platform 700 based upon information received from the smart access points. Herein, the smart access point service may be equipped with a situation control function in the form of a service. Examples of the situation control service are described below as (a) and (b). And, the situation control service may transmit/receive input/output data in connection with APIs of the exposure controller 720.

(a) Space management service—This corresponds to a service having control of space on a space in which a specific smart access point is located. This service may assign E-mail account (or address) and may acquire control of spatial information by using a time slot of the corresponding account.

(b) Device management service—This corresponds to a service having control (control of device) of an IoT device (and/or a sensor), which is connected to a specific smart access point. This service provides a function that can externally control the device by using a separate open API.

Additionally, a service respective to the spatial situation control information may be broadly divided into two different services described below as (A) and (B).

(A) Push service—When a specific event occurs in a corresponding space, the Push service provides the corresponding spatial situation information to the related surrounding IoT devices (and/or sensors) in a Push format. For example, when a terminal enters a specific space, Push service may correspond to a service providing the corresponding terminal with information on an available service or providing the corresponding terminal with a notification having the characteristics of a general notice.

(B) Device control service—When a specific service is called upon within a smart access point service platform, a smart access point may request the corresponding service logic for a control of the respective IoT devices (and/or sensors). For example, when an event having predetermined settings for the usage of a service (i.e., conference room reservation, and so on) with respect to a specific space occurs, the device control service may call upon and control a device related to such service.

In this description, the sensor and IoT devices are described as separate elements. However, the sensor may also correspond to an IoT device.

As described above, according to the exemplary embodiments of the present invention, the present invention may provide a service using a smart access point, which can interconnect and/or integrate IoT devices within a specific space, and that can connect each of multiple smart access points existing in multiple spaces to one another, thereby being capable of providing linked (or interconnected) service to one another within multiple spaces.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variations can be made in the present invention without departing from the spirit or scope of the inventions. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, it is intended that the present invention covers other realizations and other embodiments of this invention provided they come within the scope of the appended claims and their equivalents.

What is claimed is:

1. A method for providing a service in a smart access point (AP) service platform, the method comprising:
   registering multiple smart access points, each smart access point from among the multiple smart access points being included in a respective space from among multiple spaces, and being connected to at least one Internet of Things (IoT) device that is further included in each smart access point's respective space;
   providing first service control information to a first smart access point from among the multiple smart access points, the first service control information causing the first smart access point, upon using the first service control information, to control the at least one IoT device connected to the first smart access point;
   in accordance with a request of the first smart access point by a terminal of a user, using, by the first smart access point, the first service control information to provide a first service to the terminal of the user;
   providing second service control information to a second smart access point from among the multiple smart access points, the second service control information causing the second smart access point, upon using the second service control information, to control the at least one IoT device connected to the second smart access point; and
   monitoring communications between the terminal and the first smart access point to authenticate the user and to cause the terminal, upon authenticating the user, to display a movement path guiding the user to the second smart access point;
   monitoring communications between the terminal and the second smart access point to verify that the user has followed the movement path by determining communications have occurred between the terminal and the second smart access point;
   in accordance with a request of the second smart access point by the terminal of the user and when it is determined that the user has followed the movement path using, by the second smart access point, the second service control information to provide a second service to the terminal of the user.

2. The method of claim 1, wherein at least one of the multiple registered smart access points is identified by an E-mail address being assigned to the at least one registered smart access point, and
wherein the user or service related to the user acquires control of a virtual object associated with the at least one IoT device, in accordance with a request made by using the assigned E-mail address.

3. The method of claim 1, wherein a control of device on the at least one IoT device is provided to an external service, the external service being provided to the user through an open Application Programming Interface (API), and
wherein the at least one IoT device is controlled based upon an input of the user associated with the external service.

4. The method of claim 1, wherein the terminal communicates with the first smart access point and the second smart access point using an identical communication protocol.

5. A method for providing a service in a smart access point (AP) service platform, the method comprising:
registering multiple smart access points, each smart access point from among the multiple smart access points being included in a respective space from among multiple spaces, and being connected to at least one Internet of Things (IoT) device that is further included in each smart access point's respective space;
assigning an E-mail address to at least one smart access point from among the multiple registered smart access points via a time-management service that associates a time slot with the at least one smart access point in accordance with the assigned E-mail address; and
in response to a request for control being sent to the at least one smart access point using the assigned E-mail address, providing control to a user or a service related to the user, via the at least one smart access point, of the at least one IoT device included in the space corresponding to the at least one smart access point.

6. The method of claim 5, further comprising:
providing first service control information to a first smart access point from among the multiple smart access points in a first space in accordance with a request of the first smart access point by a terminal of the user; and
providing second service control information to a second smart access point from among the multiple smart access points in accordance with a request of the second smart access point by the terminal of the user when the second smart access point recognizes a movement of the user.

7. The method of claim 6, wherein a service being provided through the first service control information and a service being provided through the second service control information have service continuity between one another.

8. The method of claim 6, further comprising:
generating location information including physical location information of the multiple smart access points based upon a radio signal of the multiple smart access points.

9. The method of claim 8, further comprising:
generating location information including logical location information of the multiple smart access points based upon the physical location information, information inputted by users of the multiple smart access points, an IP address of the multiple smart access points, and tag information of at least one IoT device connected to the multiple smart access points, and wherein the second service control information is generated based upon spatial continuity between the first smart access point and the second smart access point, based upon the location information.

10. The method of claim 5, wherein the time-management service is a calendar service, and further comprising:
inviting the email address assigned to the at least one smart access point to a calendar appointment via the calendar service, and
wherein the calendar appointment identifies (i) a meeting place associated with the space corresponding to the at least one smart access point, and (ii) a time associated with when the request for control of the at least one IoT device included in the space corresponding to the at least one smart access point is to be sent.

11. The method of claim 5, comprising:
managing information on IoT devices connected to the multiple smart access points; and
providing the user with a service through an IoT device connected to the at least one smart access point,
wherein the at least one smart access point is accessed by a terminal of the user,
wherein, when an IoT device from among the connected IoT devices experiences an error or change therein, the service is provided to the user by (i) using another IoT device connected to the at least one smart access point, or (ii) by using an IoT device connected to another smart access point belonging to another neighboring space.

12. A system providing a service realized through a smart access point service platform, the system comprising:
a memory storing program code including computer-readable instructions;
a processor configured to execute the computer-readable instructions to:
register and authenticate multiple smart access points corresponding to multiple spaces;
provide a virtual object based service to (i) facilitate internal and external interconnection interface functions respective to a service provided by the smart access point service platform and each of the multiple smart access points, and (ii) generate an open Application Programming Interface (API);
manage location information including at least one of physical location information and logical location information of the multiple smart access points;
manage each of the IoT devices connected to each of the multiple smart access points and available resources of an external service;
use the virtual object based service to authenticate and log diverse interface information provided in an open API format from a smart access point from among the multiple smart access points, and interconnect data between the multiple smart access points; and
authenticate a user and a service accessing the smart access point.

13. The system of claim 12, wherein the processor is configured to:
assign an identifier to the smart access point based upon unique information when a connection is established with the smart access point;
manage a connection with the smart access point; and
manage location information on the smart access point based upon an IP address and information inputted by a user of the smart access point.

14. The system of claim 12, wherein the processor is configured to:

manage IoT devices and space information registered to the smart access point
update information on the IoT devices and the space information in a resource status database, the information on the IoT device and the space information being received from the smart access point;
monitor resource information respective to the IoT devices associated with the smart access point to detect errors or changes occurring in one of the IoT devices connected to the smart access point, and to provide information on another IoT device to replace the one of the IoT devices having errors or changes; and
call a service for controlling space and device, when the service for controlling space and device is being provided within the smart access point service platform.

15. The system of claim 14, wherein the other IoT device includes an IoT device connected to the smart access point or an IoT device connected to another smart access point that belongs to a space neighboring the space corresponding to the smart access point.

16. The system of claim 12, wherein the processor is configured to:
configure physical location information between the multiple smart access points based upon a radio signal of the multiple smart access points;
map logical location information of the multiple smart access points based upon at least one of (i) the physical location information, (ii) information inputted by users of the multiple smart access points, (iii) IP address of the multiple smart access points, and (iv) tag information of at least one IoT device connected to the multiple smart access points, to (a) a location of an actual environment, or (b) to a relative location within a building; and
generate information on a relation between each resource based upon information on the IoT devices registered to the multiple smart access points.

17. The system of claim 16, wherein another IoT device for replacing the one of the IoT devices having errors or changes is searched, based upon information on a relation between at least one of (i) location information of the physical location information, and (ii) the logical location information, and the resource.

18. The system of claim 16, wherein service control information that is capable of being connected to a service of a smart access point belonging to a previous space is connected through another smart access point belonging to a new space when the user moves from one space to another.

19. The system of claim 12, wherein the processor is further configured to execute the computer-readable instructions to register and authenticate the multiple smart access points corresponding to multiple spaces to facilitate each of the multiple smart access points executing a virtual object (VO) associated with each Internet of Things (IoT) device connected to each respective smart access point.

* * * * *